(12) United States Patent
Aspelmeier et al.

(10) Patent No.: US 8,559,690 B2
(45) Date of Patent: Oct. 15, 2013

(54) TOMOGRAPHIC IMAGING USING POISSONIAN DETECTOR DATA

(75) Inventors: Timo Aspelmeier, Goettingen (DE);
Gernot Ebel, Goettingen (DE);
Christoph Hoeschen, Hebertshausen (DE)

(73) Assignee: Scivis wissenschaftliche Bildverarbeitung GmbH, Goettingen (DE)

( * ) Notice: Subject to any disclaimer, the term of this patent is extended or adjusted under 35 U.S.C. 154(b) by 0 days.

(21) Appl. No.: 12/990,849

(22) PCT Filed: Jan. 28, 2010

(86) PCT No.: PCT/EP2010/000526
§ 371 (c)(1),
(2), (4) Date: Dec. 23, 2010

(87) PCT Pub. No.: WO2011/091815
PCT Pub. Date: Aug. 4, 2011

(65) Prior Publication Data
US 2012/0281896 A1       Nov. 8, 2012

(51) Int. Cl.
*G06K 9/00*         (2006.01)
(52) U.S. Cl.
USPC ............................................. 382/131
(58) Field of Classification Search
None
See application file for complete search history.

(56) References Cited

U.S. PATENT DOCUMENTS

| | | | |
|---|---|---|---|
| 7,180,975 B2 * | 2/2007 | Heuscher et al. | 378/4 |
| 7,346,142 B2 * | 3/2008 | Forthmann et al. | 378/4 |
| 2006/0269130 A1 * | 11/2006 | Maroy et al. | 382/173 |
| 2007/0041658 A1 * | 2/2007 | Mishima et al. | 382/278 |
| 2007/0238986 A1 * | 10/2007 | Graumann | 600/424 |
| 2008/0056550 A1 * | 3/2008 | Kadir et al. | 382/131 |

OTHER PUBLICATIONS

Bechler et al., "Greedy Wavelet Projections are Bounded on BV", Transactions of American Mathematical Society, vol. 359 (2), pp. 619-635 (2007).
Candes et al., "An Introduction to Compressive Sampling", IEEE Signal Processing Magazine, pp. 21-30 (2008).
Cohen et al., "Nonlinear Approximation and the Space BV (R2)", American Journal of Mathematics, vol. 121, p. 587-628 (1999).

(Continued)

*Primary Examiner* — Nancy Bitar
(74) *Attorney, Agent, or Firm* — Caesar, Rivise, Bernstein, Cohen & Pokotilow, Ltd.

(57) ABSTRACT

An image reconstruction method for reconstructing a tomographic image ($f_j$) of a region of investigation within an object (1), comprises the steps of providing detector data ($y_i$) comprising Poisson random values measured at an i-th of a plurality of different positions, e.g. i=(k,l) with pixel index k on a detector device and angular index l referring to both the angular position ($\alpha_l$) and the rotation radius ($r_l$) of the detector device (10) relative to the object (1), providing a predetermined system matrix $A_{ij}$ assigning a j-th voxel of the object (1) to the i-th detector data ($y_i$), and reconstructing the tomographic image ($f_j$) based on the detector data ($y_i$), said reconstructing step including a procedure of minimizing a functional F(f) depending on the detector data ($y_i$) and the system matrix $A_{ij}$ and additionally including a sparse or compressive representation of the object (1) in an orthobasis T, wherein the tomographic image ($f_j$) represents the global minimum of the functional F(f). Furthermore, an imaging method and an imaging device using the image reconstruction method are described.

14 Claims, 3 Drawing Sheets

(56) References Cited

OTHER PUBLICATIONS

Elbakri et al., "Statistical Image Reconstruction for Polyenergetic X-Ray Computed Tomography", IEEE Transactions on Medical Imaging, vol. 21, pp. 89-99 (2002).

Harmany et al., "Sparse poisson intensity reconstruction algorithms", Statistical signal processing, 2009. SSP '09 IEEE/SP 15th workshop on IEEE, Piscataway, NJ, USA, Aug. 31, 2009, pp. 634-637, ISBN: 978-1-4244-2709-3.

Haupt et al., "Signal reconstruction from noisy random projections", IEEE Trans. on Information Theory, vol. 52(9), pp. 4036-4048 (2006).

Kay, J., "The EM algorithm in medical imaging", Statistical Methods in Medical Research, vol. 6, pp. 55-75 (1997).

Lange et al., "EM Reconstruction Algorithms for Emission and Transmission Tomography", Journal of Computer Assisted Tomography, vol. 8, pp. 306-316 (1984).

Lingenfelter et al., "Sparsity regularization for image reconstruction with Poisson data", Computational Imaging VII, vol. 7246 (2009).

Noras, "Some formulas for moments of the Poisson distribution", "Phys. Rev. B", vol. 22 (12), pp. 6474-6475 (1980).

Panin, "Regularization methods in iterative algorithms for variance reduction on compressed sinogram random coincidences", 2009 IEEE Nuclear Science Symposium Conference Record, pp. 2834-2838.

Shepp et al., "Maximum Likelihood Reconstruction for Emission Tomography", IEEE Transactions on Medical Imaging, vol. MI-1 (2), pp. 113-122 (1982).

Starck et al., "An Overview of Inverse Problem Regularization Using Sparsity", 2009 16th IEEE International Conference, pp. 1453-1456.

Willett et al., "Performance bounds on compressed sensing with Poisson noise", IEEE International Symposium on Information Theory ISIT, Jun. 28, 2009-Jul. 3, 2009, pp. 174-178.

International Search Report for PCT/EP2010/000526.

Sardy et al., "Automatic Smoothing with Wavelets for a Wide Class of Distributions", Journal of Computational and Graphical Statistics, vol. 13, No. 2, pp. 1-23.

Rahmim, A., et al., "Accurate Event-Driven Motion Compensation in High-Resolution PET Incorporating Scattered and Random Events", IEEE Transactions on Medical Imaging, vol. 27, No. 8, Aug. 2008.

\* cited by examiner

TOMOGRAPHIC IMAGING USING POISSONIAN DETECTOR DATA

ACKNOWLEDGEMENT OF GOVERNMENT SUPPORT

The work leading to this invention has received funding from the European Atomic Energy Community's Seventh Framework Programme ([FP7/2007-2011]) under grant agreement no FP7-212100.

FIELD OF THE INVENTION

The invention relates to an image reconstruction method for reconstructing a tomographic image of an object based on detector data contaminated with Poisson noise, especially detector data collected with an emission tomographic device, like e.g. a SPECT or PET imaging device, or with a transmission tomographic device, like a CT imaging device operating e.g. under low photon-flux conditions. In particular, the image reconstruction method is based on a non-analytical image reconstruction using a minimizing algorithm. Furthermore, the invention relates to an imaging method including the image reconstruction method. Furthermore, the invention relates to an imaging device implementing the imaging and image reconstruction methods.

BACKGROUND OF THE INVENTION

Non-analytical image reconstruction is a generally known approach for a volumetric reconstruction, most commonly used for emission tomographic data, based e.g. on SPECT (single photon emission computed tomography) or PET (positron emission tomography) measurements (see K. Lange et al. "EM Reconstruction Algorithms for Emission and Transmission Tomography" in "Journal of Computer Assisted Tomography", vol. 8 (2), April 1984, p. 306-316, L. A. Shepp et al. "Maximum Likelihood Reconstruction for Emission Tomography" in "IEEE Transactions on Medical Imaging" vol. MI-1 (2), October 1982, p. 113-122), and J. Kay "The EM algorithm in medical imaging" in "Statistical Methods in Medical Research" vol. 6, 1997, p. 55-75). In contrast to the analytical approach, in particular using a back-projection algorithm (e.g. filtered back-projection, FBP), the non-analytical solution uses a minimizing algorithm for finding image data which represent the best fit for the detector data. The non-analytical approach intrinsically can cope better with input data suffering from noise and is able to account for physical processes degrading the measured data. The measured data often suffer from very bad photon statistics. In order to obtain useful results, long measurement times and relatively high patient doses are necessary, putting unnecessary stress on the patient. These restrictions would be avoided if images could be reconstructed from few measurements with the concept of Compressive Sensing (CS) as proposed e.g. for conventional optical images collected with a camera.

Compressed Sensing (or: compressive sensing, compressive sampling and sparse sampling), is a technique for acquiring and reconstructing a signal utilizing the prior knowledge that it is sparse or compressible. An introduction to CS has been presented by Emmanuel J. Candès et al. ("An Introduction To Compressive Sampling" in "IEEE Signal Processing Magazine" March 2008, p. 21-30). The CS theory shows that sparse signals, which contain much less information than could maximally be encoded with the same number of detected data entries, can be reconstructed exactly from very few measurements in noise free conditions.

According to Jarvis Haupt et al. ("Signal reconstruction from noisy random projections" in "IEEE Trans. on Information Theory" vol. 52(9), 2006, p. 4036-4048), a set of data $f_j^*$ of size v (j=1, ..., v) which is sparse (or rather "compressible") can be accurately reconstructed from a small number k of random projections even if the projections are contaminated by noise of constant variance, e.g. Gaussian noise. Specifically, $y_i=\Sigma_j \phi_{ij} f_j^* + \xi_i$ with i=1, ..., k are the noisy projections of $f_j^*$, taken with the projection matrix $\phi_{ij}$ which consists of random entries all drawn from the same probability distribution with zero mean and variance 1/v and the noise $\xi_i$ is drawn from a Gaussian probability distribution with zero mean and variance $\sigma^2$. By finding the minimizer $\hat{f}_j$ of a certain functional (to be shown in detail below), one obtains an approximation to $f_j^*$ for which the average error is bounded by a constant times $(k/\log v)^{-\alpha}$ with $0 < \alpha \leq 1$, i.e. the error made depends only logarithmically on v. To put it another way, the error can be made small by choosing k/log v large, but it is by no means necessary to have k/v close to 1. Accurate reconstruction is possible even if the number of projections is much smaller than v, as long as k/log v is large.

A crucial point in the derivation of the above result is the fact that the variance of the noise $\xi_i$ is a constant. Even though a similar results could be obtained for non-Gaussian noises (provided certain noise properties required for the validity of the Craig-Bernstein inequality can be proved), the result does not easily carry over to the case that the variance of the noise depends on the values $f_j^*$. Yet this is precisely what happens e.g. in photon limited imaging systems or in emission tomography where a main source of noise is the discrete quantum nature of the photons. In this case the projections $y_i$ have Poisson statistics with parameter $\mu_i=\Sigma_j \phi_{ij} f_j^*$. This parameter is equal to the mean of $y_i$ but also to its variance.

In the past, it was tested whether the principle of accurate reconstructions from few projections carries over to Poisson noise in order to make accurate reconstructions possible with fewer measurements, e.g. in emission tomography. It was expected that the compressive sensing strategy for the reconstruction of sparse or compressible objects from few measurements is difficult to apply to data corrupted with Poisson noise, due to the specific properties of Poisson statistics and the fact that measurements can not usually be made randomly, as in many other cases.

Rebecca M. Willett et al. ("Performance bounds on compressed sensing with Poisson noise" in "IEEE International Symposium on Information Theory ISIT" 2009, Jun. 28, 2009-Jul. 3, 2009, p. 174-178) have generalized results from Jarvis Haupt et al. to Poisson noise. In particular, Rebecca M. Willett et al. have proposed to reconstruct a tomographic image from detector data using a procedure of minimizing a functional $\hat{f}$ depending on a sensing matrix A and the detector data and further depending on a penalty term, wherein the sensing matrix A is constructed on the basis of statistic Rademacher variables and the penalty term depends on the sparsity of the object. However, the result was discouraging: it was found that the upper bound on the error increases with the number of measurements, i.e. more measurements seem to make the accuracy smaller.

There is a strong interest in imaging techniques where the main source of noise is the Poisson statistics of the photons, e.g. in emission tomography, to apply CS strategies, in particular for obtaining shorter acquisition times and reduced motion artifacts.

OBJECTIVE OF THE INVENTION

The objective of the invention is to provide an improved image reconstruction method for reconstructing a tomographic image of an object, in particular for emission tomography purposes or for very low dose transmission tomography purposes, which is capable of avoiding disadvantages of conventional techniques. In particular, the objective is to provide an image reconstruction method which enables reconstructing the tomographic image with a reduced quantity of detector data without a loss in image quality. Furthermore, the objective of the invention is to provide an improved imaging method avoiding disadvantages of conventional imaging techniques. Furthermore, the objective of the invention is to provide an improved imaging device in particular being adapted for conducting the inventive imaging method.

SUMMARY OF THE INVENTION

The above objectives are solved by an image reconstruction method, an imaging method and/or an imaging device comprising the features of the independent claims Advantageous embodiments of the invention are defined in the dependent claims.

According to a first aspect of the invention, an image reconstruction method is proposed for reconstructing a tomographic image ($f_j$) of a region of investigation within an object from detector data ($y_i$) comprising Poisson random values measured at an i-th of a plurality of different positions relative to the object. The positions are the spatial locations of measuring the detector data, e.g. the position of a detector element (pixel) with index k of a SPECT detector device at the time of collecting data with this detector device under its l-th angular position $\alpha_l$ with respect to the object and under its l-th distance $r_l$ from the centre of rotation (this means that in this case the index i is a two component index, i.e. i=(k,l)), or as a further example, spatial locations of detector elements sensing data at the lines of response (LOR's) of coincidence events measured with a PET detector device.

According to the invention, a predetermined system matrix $A_{ij}$ assigning a j-th voxel of the object to the i-th detector data ($y_i$) is provided. Contrary to the above conventional approach of Rebecca M. Willett et al. using a random sensing matrix, elements of the system matrix $A_{ij}$ are not statistic values but rather selected by geometrically or physically assigning contributions of each of the voxels (object data) to each detector element of a detector device or the associated detector data, resp. The system matrix which defines the detector data as linear combinations of the original object data is determined by geometric or physical features of the imaging device, in particular by the arrangement of the object relative to the detector device and the detector device geometry.

Furthermore, according to the invention, the tomographic image ($f_j$) is reconstructed by minimizing a functional F(f) depending on the detector data ($y_i$) and the system matrix $A_{ij}$ and additionally including a sparse or compressive representation of the object in an orthogonal basis T. The orthogonal basis (orthobasis) T is an orthogonal matrix, the columns of which are orthonormal basis vectors. The orthobasis is selected such that the object, in particular the region of investigation, can be represented in the orthobasis fulfilling the requirements of sparsity or compressibility.

The minimizing procedure is a non-analytical or algebraic procedure, e.g. an iterative algorithm. The tomographic image ($f_j$) comprises the image data representing the global minimum of the functional F(f). In particular, the inventive reconstruction comprises minimizing the above functional F, which includes two or optionally three additive parts, namely an empiric risk part, which represents the Poisson statistic of the measurement, a CS part representing the compressibility of the object and (optionally) a regularization term.

For conventional reconstructions there are (at least) three problems. First, the data is noisy, second, it is necessary to perform a large number of measurements in order to obtain sufficient information for an acceptable reconstruction quality and third, the reconstruction problem is ill-posed such that without further measures even an infinitesimal amount of noise generates serious artifacts. The invention is capable of overcoming all three difficulties by providing a link between a compressive sensing strategy (solving problem two) and a maximum likelihood approach (which deals optimally with problem one) for the case of Poisson noise, while still allowing for inclusion of regularization techniques addressing problem three.

The image reconstruction method can be conducted immediately after collecting the detector data, in particular with the imaging device collecting the detector data. Alternatively, the image reconstruction method can be conducted with an image reconstruction device at a distant location and/or with a delay after the measurement with detector data provided e.g. via a data communication channel from the imaging device to the image reconstruction device or from a data storage. Accordingly, the detector data ($y_i$) can be provided e.g. via a data network, from a data storage or directly by the detector device.

According to a second aspect of the invention, an imaging method for reconstructing an image ($f_j$) of a region of investigation within an object is proposed, which comprises the steps of collecting the detector data ($y_i$) with the detector device of an imaging device and subjecting the detector data ($y_i$) to the inventive image reconstruction method according to the above first aspect of the invention. Preferably, the imaging method is used for collecting is a SPECT image, a PET image, a CT image or a confocal microscopy image.

According to a third aspect of the invention, an imaging device for imaging a region of investigation in an object is proposed, which comprises a detector device for measuring detector data ($y_i$) comprising Poisson random values measured at the i-th angular position of a detector element of the detector device relative to the object, and a reconstruction device for reconstructing an image ($f_j$) the object, wherein the detector data ($y_i$) are subjected to the image reconstruction method according to the above first aspect of the invention.

Further independent subjects of the invention are a computer program residing on a computer-readable medium, with a program code for carrying out the image reconstruction method according to the above first aspect of the invention, and an apparatus comprising a computer-readable storage medium containing program instructions for carrying out the image reconstruction method according to the above first aspect of the invention.

As a main advantage, the invention provides a new method to accurately reconstruct a three dimensional image from very few detector data, e.g. projections, by non-analytical or algebraic methods using a minimizing algorithm. The inventors have found methods of exploiting the fact that real world objects are usually sparse or at least compressible while overcoming the restrictions of conventional approaches for applying CS on Poisson noise data. Emission tomographic images can be reconstructed with a number of measurements which is reduced compared with conventional measurements, whereas the same accuracy as with conventional methods can be obtained. Accordingly measurement time and/or applied activity (for emission tomography) or irradiation dose (for transmission tomography) can thus be reduced.

Further advantages can be summarized as follows. First, the quantity of measurements for obtaining a certain image quality can be reduced compared with the conventional imaging technique yielding the same image quality. The measuring time and the burden for the patient can be reduced accordingly. In particular, artifacts resulting from unintended movements of the object, e.g. of the patient, can be avoided. Second, the image reconstruction method does not include a free parameter. In particular, if sufficient information is available as to the compressibility of the object data, the tomographic image can be obtained exclusively on the basis of the detector data and the system matrix determined by the measuring arrangement. Third, the reconstruction risk (see below) can be controlled. The quality of a reconstruction can be quantitatively evaluated. The image reconstruction method considers the Poisson statistic not only in the evaluation of the risk, but rather also with the reconstruction as such, i.e. the advantages of the maximum-likelihood reconstruction are associated with the advantage of a reduced number of measurements due to applying the CS technique. Finally, the inventive method can be extended in analogy to the penalized-likelihood method for a regularization of the reconstructed object.

According to a preferred embodiment of the inventive image reconstruction method, the reconstructing step includes a procedure of minimizing the functional $$F(f)=L(\{y_i\},Af)+a\|T^T f\|$$

wherein $L(\{y_i\}, A f)$ is the maximum-likelihood risk functional for Poisson statistics, $\|T^T f\|$ is a sparsity enforcing functional including the $l_p$ norm $\| \ldots \|$ of vector $T^T$ f with $0 \leq p < 2$, and a is a calibration factor.

The orthogonal basis (orthobasis) T is selected to be as incoherent as possible with respect to the system matrix $A_{ij}$ and such that the object f (or a comparable typical object) has a compressible representation in this basis. These criteria were introduced previously e.g. by J. Candès et al. (see above). A particular advantage of this embodiment, which is explained with further details below, can be obtained by the application of the $l_p$ norm with $0 \leq p < 2$, e.g. p=1. In this case, the minimization procedure has a single global minimum allowing an implementation with an increased processing speed.

The calibration factor a is a predetermined fixed parameter, which is not changed during the minimization procedure, i.e. it is not a fit parameter. Further features of the calibration factor a are described below. By a preliminary determination of the calibration factor a, the tomographic reconstruction can be improved. This is a further difference compared with the above conventional approach of Rebecca M. Willett et al.

According to a further advantageous embodiment of the invention, the functional F(f) additionally can include an additive regularization function R(f)

$$F(f)=L(\{y_i\},Af)+a\|T^T f\|+R(f).$$

As an advantage, the regularization function R can be constructed for suppressing artifacts in the reconstructed tomographic image.

A further advantage of the invention is given by the fact that various approaches for determining (adjusting) the system matrix are available. As a first variant, the system matrix can be adjusted using reference data of the measuring system used for collecting the detector data. The reference data can be stored as specific data of the measuring system in the image reconstruction device, e.g. in the imaging device. According to a second variant, the entries of the system matrix can be acquired using a calibration measurement. In this case, collecting the detector data is performed with a calibration object (phantom) having known volumetric object data. The calibration detector data can be used for adjusting the elements of the system matrix.

Another advantage of the invention is given by the fact that various bases are available as orthobasis T. As it is known from the theory of three-dimensional wavelets (see A. Cohen et al. in "American Journal of Mathematics", Volume 121, 1999, p. 587-628, and P. Bechler et al. in "Transactions of American Mathematical Society", Volume 359 (2), 2007, p. 619-635), objects with so-called bounded variation have compressible wavelet coefficients. This condition is indeed fulfilled for the objects of the real world, so that a suitable orthobasis using three-dimensional wavelets with a finite support can be found for any object to be investigated. Therefore, according to a preferred embodiment of the invention, the orthobasis T is a basis of three-dimensional wavelets with a compact carrier. Alternatively, if a certain prior knowledge is available about the object or the structure thereof, an adapted orthobasis can be constructed with entries depending on typical object data of the object to be imaged. In this case, the orthobasis can be matched to the type of object for improving the image reconstruction. As an example, if it is known that the object is sufficiently smooth, it will have predominantly low spatial frequency components such that a Fourier basis is adequate. Alternatively, one could choose a basis of Chebyshev polynomials in the plane combined with a one dimensional Fourier basis in the axial direction. For real world objects a principal components analysis of a number of reference objects may generate a suitable orthobasis.

The invention provides further particular advantages for the imaging method, in particular for selecting or setting the angular positions at which the detector data are collected. According to a preferred embodiment of the invention, a randomized setting of the angular positions can be provided. According to a further, alternative embodiment of the invention, the detector data can be continuously collected, e.g. with a SPECT device while the angular positions of the detector device thereof are changed continuously and not in the usual step-and-shoot mode. Accordingly, the imaging speed can be essentially increased.

According to a further, particularly preferred embodiment of the invention, a preparation step can be provided before the collection of the detector data. The preparation step comprises a setting of an image quality measure (risk) to be fulfilled by the imaging method. Depending on the risk, the number of angular positions is selected at which detector data are collected. Accordingly, for obtaining a preview image wherein a low image quality is sufficient, a reduced number of angular positions is used, while for a subsequent regular imaging with improved image quality, the number of angular positions (and correspondingly detector data) is increased.

Further important features of the invention may be represented by additional steps conducted after the image reconstruction, like e.g. storing, recording, displaying and/or further image processing of the reconstructed tomographic image.

BRIEF DESCRIPTION OF THE DRAWINGS

Further details and advantages of the invention are described in the following with reference to the attached drawings, which show in.

DESCRIPTION OF PREFERRED EMBODIMENTS

Preferred embodiments of the invention are described here with exemplary reference to emission tomography, in particular SPECT. The application of the invention is not restricted to SPECT, but rather possible with other image data contaminated with a Poisson noise, like e.g. PET data and CT data, in particular with low photon flux. Details of measuring techniques, like e.g. details of SPECT devices and modes of operating those devices are not described as far as they are known from conventional techniques. Furthermore, the invention is not restricted to medical imaging, but rather can also be implemented for imaging other objects, like e.g. work pieces.

Embodiments of the invention are described in the following with reference to the procedural steps of the inventive methods. Implementing these features as data processing tools will depend on e.g. the measuring system used and the type of object to be imaged in practice. While the understanding and the implementation of the features is based on the mathematical background outlined below, the skilled person will recognize that the invention is not restricted to all mathematical details, but covers all data processing tools generally based on this mathematical background.

1. Imaging Device

Figure 1:
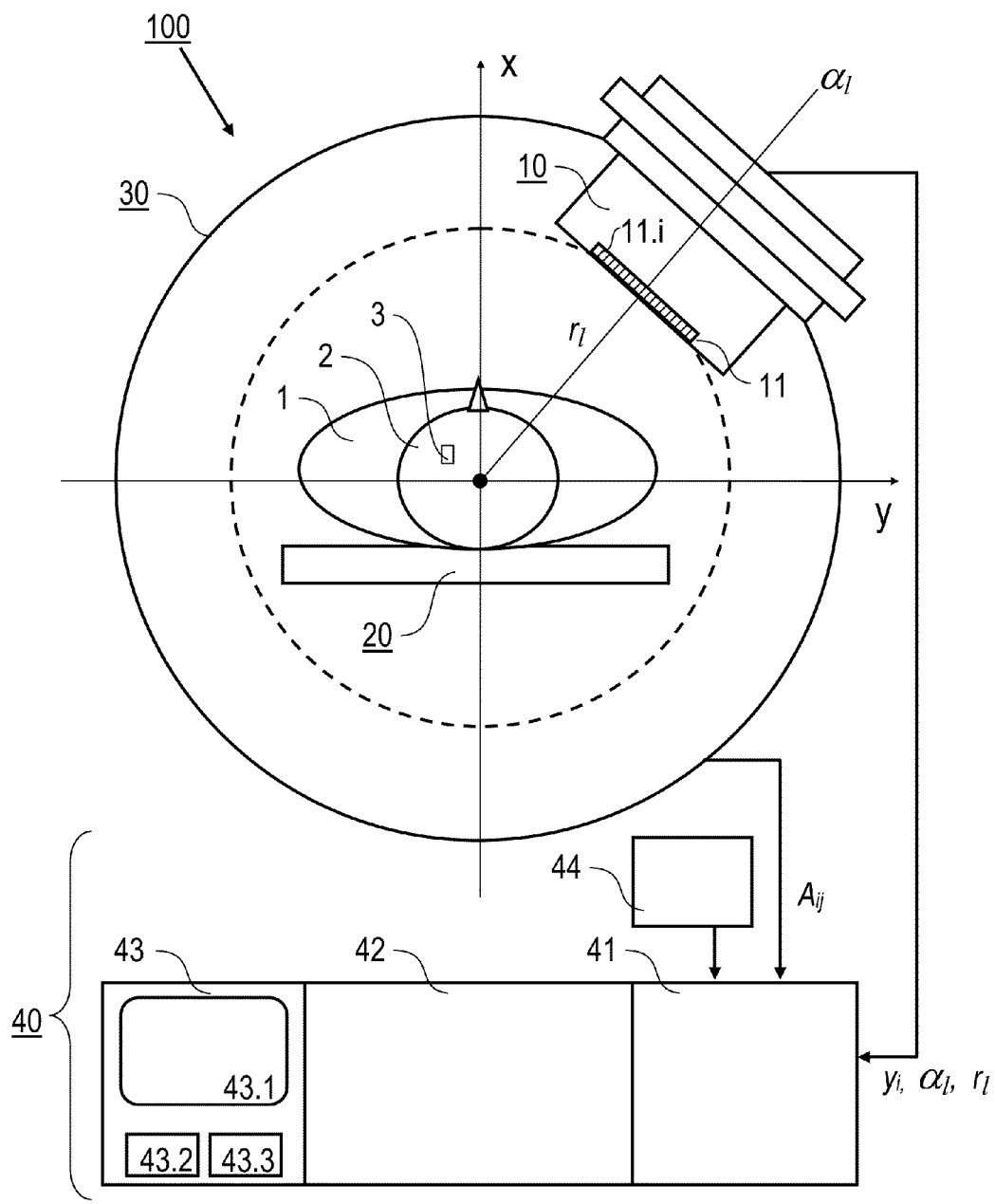
FIG. 1: a schematic representation of an imaging device embodying the present invention.

FIG. 1 schematically illustrates a sectional view of an embodiment of an imaging device 100 including a detector device 10, an object carrier 20, a detector carrier 30 and a reconstruction device 40. The components 10, 20 and 30 are structured like in a conventional SPECT device, e.g. a one-headed Siemens e.cam. In particular, the detector device 10 comprises an array 11 of detector elements 11.$i$ ($i=1, 2, 3, \ldots$), which are arranged in a one- or, more commonly, two-dimensional geometry (line-shaped array or matrix-shaped array). The detector device 10 is rotatably mounted on the detector carrier 30 such that it can be rotated in an x-y-plane around the object carrier 20. The object carrier 20 is a support device, e.g. table, configured for accommodating the object 1, e.g. a patient to be investigated. As an example, the object carrier 20 comprises a carrying bed for accommodating the patient as schematically illustrated in FIG. 1. The detector carrier 30 comprises e.g. a circular rail to which the detector device 10 is attached. The object carrier 20 and the detector carrier 30 can be translated relative to each other in a direction perpendicular to the x-y-plane (drawing plane).

The object 1 is e.g. a human patient, wherein a certain portion (region of investigation 2), e.g. the brain is to be investigated with the inventive imaging method. In terms of the imaging and image reconstruction methods, the region of investigation 2 is considered as consisting of a plurality of voxels 3. The j-th voxel 3 is schematically shown for illustrative purposes. The patient has an administered tracer substance which is accumulated with a concentration distribution in specific regions, e.g. certain tissue or organ. This concentration distribution is to be imaged. The tracer substance carries a radioactive marker emitting γ radiation as it is known from conventional SPECT measurements. The detector device 10 is moved to preferably randomized angular positions $\alpha_l$ and suitable detector radii $r_l$ where the γ photons are detected. The collected detector data $y_i$ together with $\alpha_l$ and $r_l$ are transferred to the input circuit 41.

The reconstruction device 40 comprises an input circuit 41, a processing circuit 42, an output circuit 43, and an entry storage 44. The input circuit 41 is arranged for receiving the detector data and further entries, which are necessary for implementing the inventive image reconstruction method. To this end, the detector device 10 is connected with the input circuit 41 for transferring detector data $y_i$ and the associated angular position $\alpha_l$. Furthermore, the input circuit 41 is connected with the entry storage 44 being arranged for storing the system matrix $A_{ij}$, the orthobasis T and optionally the regularization function R. The processing circuit 42 includes a computer unit, which is configured for implementing the data processing of the image reconstruction method. Finally, the output circuit 43 may comprise a display 43.1, a data storage 43.2 and/or an interface 43.3. In particular, the output circuit 43 may include a Dicom-node. The reconstruction device 40 can be implemented with a standard computer having an appropriate hardware configuration.

2. Image Reconstruction and Imaging Methods

Figure 2:
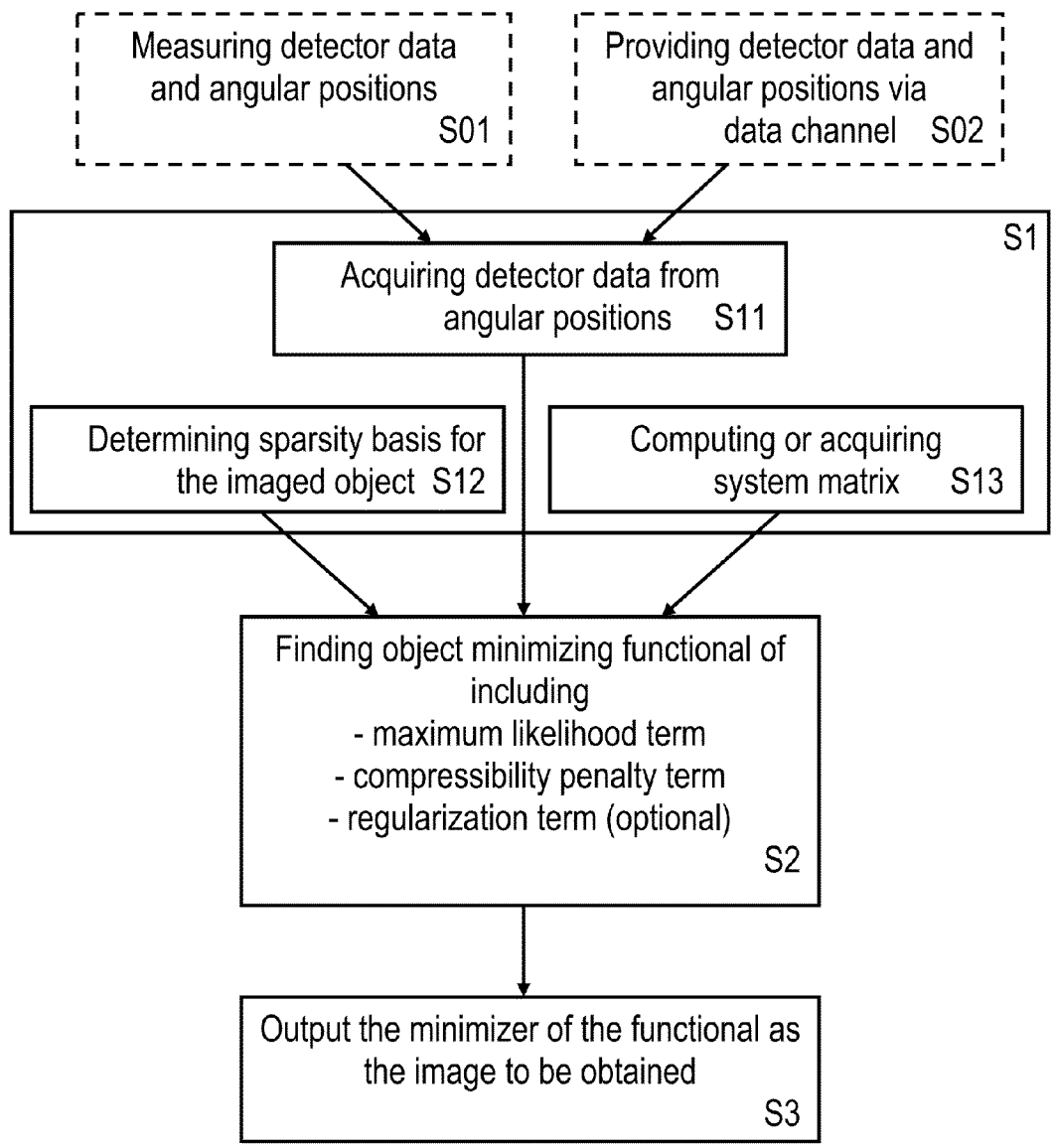
FIG. 2: a schematic flowchart illustrating embodiments of the inventive image reconstruction and imaging methods.

The essential steps of the inventive image reconstruction method are schematically summarized in FIG. 2. Firstly, the detector data with the associated angular positions as well as the remaining input entries are provided with step S1. Subsequently, the reconstructing step S2 with finding an object minimizing functional is conducted, followed by step S3 of presenting the tomographic image consisting of the minimizer of the functional.

Step S1 in particular includes the provision (step S11) of the detector data (as measured preferably) from random angular positions and the associated angles and radii. Step S11 depends on particular application conditions and the data source used. The detector data and angular positions can be measured (step S01) and input directly from the detector device 10 (FIG. 1). In this case, the procedure of FIG. 2 including the step S01 represents an embodiment of the inventive imaging method. Measuring the detector data is conducted as commonly known from SPECT devices. Optionally, selecting a number of measurements in dependence on the image quality to be obtained can be provided on the basis of the considerations summarized in 3.7 below. Furthermore, as an alternative, the detector data and angular positions can be input via a data communication channel (step S02). With this variant, steps S1 to S3 represent an embodiment of the inventive image reconstruction method.

Step S1 further includes step S12 of determining a sparsity orthobasis T which is suitable for the measured object, e.g. a wavelet basis with finite support. Depending on the type of object, the orthobasis can be stored in the entry storage 44 (FIG. 1). Furthermore, step S1 includes the provision of a predetermined system matrix $A_{ij}$ (step S13). The system matrix is computed or acquired from reference system data. In particular, the system matrix represents the contribution of the j-th voxel 3 to the i-th detector data 11.$i$ (FIG. 1).

With step S2, the data processing is conducted including the minimization routine, in which the three-dimensional object $f_j$ is sought, which realizes the global minimum of the functional $F(f)=L(\{y_i\}, A f)+\alpha \|T^T f\|$. Details of this functional are outlined in section 3. below.

Finally, the result of the minimization routine is output as the final result with step S3, where it is transferred e.g. to a Dicom-node included in the output circuit 43 (FIG. 1).

3. Mathematical Background

In the following, it is demonstrated that the disappointing and seemingly counterintuitive result presented by Rebecca M. Willett et al. is essentially due to a too restrictive notion of "error": since the variance of a Poissonian random variable increases when its mean value increases, it cannot be expected to obtain the same absolute accuracy when $f_j^*$ is large as when $f_j^*$ is small. Yet the measure of error used in by Rebecca M. Willett et al. was the risk $$R(f^*, f) = \frac{1}{v} \sum_v (f_j - f_j^*)^2$$

(up to normalization), which does not take this into account. Note that this observation has nothing to do with the type of reconstruction algorithm and lies in the nature of the Poisson statistics.

When the definition of "risk" is modified to reflect this fact, it will be shown that the principles of compressive sensing can indeed be useful and allow the reconstruction of $f_j^*$ faithfully within the bounds given by nature.

3.1 Preliminary Discussion and Notations

A three dimensional object $f_j^*$ is considered, wherein the subscript j indexes the voxels, of which it is assumed to have v. The object is observed through projections $$\bar{\mu}_i^* = \sum_j A_{ij} f_j^* + r_i, \quad (1)$$

where $A_{ij}$ is the system matrix, for example the discretized integral kernel of the Radon transform. The constants $r_i > 0$ indicate the background count rate which is always present in practice. These projections are, however, not directly observed, but they are the parameter of a Poisson process, i.e. a number $y_i$ of quanta (γ photons, for instance) is measured drawn from a Poisson distribution with probability $$P(y_i) = e^{-\bar{\mu}_i^*} \frac{(\bar{\mu}_i^*)^{y_i}}{y_i!}.$$

From these measurements $y_i$ the original object $f_j^*$ is to be reconstructed as accurately as possible from as few projections as possible. This is the situation usually seen in SPECT.

In order to formulate this problem mathematically, a large number n of "potential" projections $\bar{\mu}_i$, $i=1, \ldots, n$ is considered. The number of projections n is assumed to be of the same order of the number of voxels, v, i.e. n=O(v). Only a small random subset $i \in \Omega \subset \{1, \ldots, n\}$ of the potential projections is actually measured. The set $\Omega$ has size k, and it will be shown in the end that k may be much smaller than n while still allowing for accurate reconstruction. Thus the actual projections are written as $$\mu_i^* = \sum_j P_{ij} \bar{\mu}_j^*, \quad i = 1, \ldots, k \quad (2)$$

where $P_{ij}$ is a k×n random matrix of all 0s, except for exactly one 1 at a uniformly distributed random position in each row, with different rows being independent. For each of these random projections a noisy Poisson variable $y_i$, $i=1, \ldots, k$ is measured. Note that this definition allows, in principle, that multiple measurements of the same projections are made. The probability of this happening is however small when n>>k. This definition of random projections is different from "Rademacher chaos" which is often used in the literature for which each entry is ±1 with equal probability (up to a constant factor). The reason is that for Poisson measurements there is a positivity requirement, and linear combinations with negative weights cannot be chosen (in fact the weights cannot be chosen at all as they are given by the system matrix), and thus it only can be randomized which projections are being used.

In order to measure the accuracy of the eventual reconstruction, the following definition of "risk" is used. A potential reconstruction f would produce projections $\bar{\mu}_i = \sum_j A_{ij} f_j$ and has risk R(f) with $$R(\underline{f}) = \frac{1}{n} \sum_{i=1}^{n} (\bar{\mu}_i - \bar{\mu}_i^* \log(\bar{\mu}_i)) =: \frac{1}{n} \sum_{i=1}^{n} R_i(\bar{\mu}_i). \quad (3)$$

The definition $R_i(\bar{\mu}_i) = \bar{\mu}_i - \bar{\mu}_i^* \log(\bar{\mu}_i)$ will be used below. This definition of risk is modeled after the Maximum Likelihood functional derived from Poisson statistics and honors the fact that the uncertainty in estimating a Poisson parameter μ is of order $\sqrt{\mu}$ and not a constant. The risk is minimal when $\bar{\mu} = \bar{\mu}^*$, which is the case when $f = f^*$. The risk R(f) has the additional property that the "excess risk"

$$r(f, f^*) := R(f) - R(f^*) \quad (4)$$

is a homogeneous function of degree 1, i.e.

$$r(\lambda f, \lambda f^*) = \lambda r(f, f^*). \quad (5)$$

This shows that it is a measure of the absolute error, and that the relative error can be obtained by dividing $r(f, f^*)$ by a measure of the total intensity, e.g. by $$\kappa = \frac{1}{n} \sum_{i=1}^{n} \bar{\mu}_i^*.$$

This definition of risk is not immediately useful since it requires complete knowledge of $f^*$, which is to be estimated in the first place. Therefore the risk is to be estimated from the data actually measured, and this leads to the empirical risk $\hat{R}(f)$:

$$\hat{R}(\underline{f}) = \frac{1}{k} \sum_{i=1}^{k} (\mu_i - y_i \log(\mu_i)) \quad (6)$$

with $\mu_i = \sum_j P_{ij} \bar{\mu}_j$. Again, this is nothing but the Maximum Likelihood functional of Poisson statistics. It is easy to show that on average, $E\hat{R}(f) = R(f)$. The average $E \ldots$ is an average over both the Poisson statistics of the $y_i$ (to be done first) and the random matrices $P_{ij}$. Analogously to above, the empirical excess risk is defined $$\hat{r}(f, f^*) = \hat{R}(f) - \hat{R}(f^*). \quad (7)$$

Below the compressibility property of the object $f^*$ in some sparsity basis will be used. Let $T^T$ be an orthogonal matrix the rows of which are filled with the orthonormal basis vectors of the sparsity basis. Then objects $f^*$ are considered for which the coefficients in the sparsity basis, $\underline{\theta}^* = T^T \underline{f}^*$, obey $$|\theta_k^*| \leq C\sqrt{v} k^{-1/q}, \quad (8)$$

where C'>0 and 0<q are constants and the $\theta_k^*$ are ordered by size. From this inequality one can easily conclude that the error of the best m-term approximation $\underline{\theta}^{(m)}$ to $\underline{\theta}^*$ is bounded by $$\frac{1}{v}|\underline{\theta}^{(m)} - \underline{\theta}^*|^2 = \frac{1}{v}\sum_{k=m+1}^{v}|\theta_k^*|^2 \leq C'^2 \int_m^v dx\, x^{-2/q} \leq \frac{C'^2}{\frac{2}{q}-1}m^{1-2/q} \qquad (9)$$

$$= \frac{C'^2}{2\alpha}m^{-2\alpha}$$

with $$\alpha = \frac{1}{q} - \frac{1}{2}.$$

Likewise it can be shown that this implies $$\frac{1}{v}|\underline{\theta}^*|^2 = \frac{1}{v}|\underline{f}^*|^2 \leq \frac{2}{2-q}C'^2 =: D^2 \qquad (10)$$

with a positive constant D, i.e. the objects f* come from a ball of radius $D\sqrt{v}$. In order to be useful, it is required that $\alpha > 0$, such that $0 < q < 2$. However, later on, a stronger requirement actually will be necessary, namely $0 < q < 1$, which means that the objects must be reasonably strongly compressible.

3.2 Oracle Inequality

Although the risk R(f) is not directly applicable, it is very useful since it allows us to derive an "oracle inequality" which states that the average empirical risk $E\hat{R}(f)$ of a reconstruction (obtained in a way to be described below) taken from a candidate set is, roughly speaking, within a constant factor of the ideal risk $R(f_{min})$ of the best approximation $f_{min}$ in the candidate set. This means that even if complete knowledge of f* would be available and thus the optimal approximation in the candidate set could be found, this optimal approximation would be only marginally better than what is found without this prior knowledge.

Following Jarvis Haupt et al. very closely, it will be shown that for $$\hat{\underline{f}}_{min} = \operatorname*{argmin}_{\underline{f}}\left(\hat{R}(\underline{f}) + \frac{c(\underline{f})\log 2}{k\varepsilon}\right), \qquad (11)$$

where c(f) is a penalty term to be specified later, the risk is bounded by $$Er(\hat{\underline{f}}_{min}, \underline{f}^*) \leq C_1\left(r(\underline{f}_{min}, \underline{f}^*) + \frac{c(\underline{f}_{min})\log 2 + 4}{k\varepsilon}\right) \qquad (12)$$

with a constant $C_1$ of order 1 and $\epsilon$ a constant to be specified later. As will be seen below, the oracle inequality can only be proved for compressible objects, unlike in Jarvis Haupt et al. where a similar inequality holds for all objects with bounded norm. However, this restriction does not matter in the end as there is only interest in compressible objects anyway.

3.2.1. Proof of the Oracle Inequality

Consider $$\hat{r}(\underline{f}, \underline{f}^*) = \frac{1}{k}\sum_{i=1}^{k}\left[\underbrace{\mu_i - y_i \log(\mu_i)}_{=:\xi_i} - \underbrace{(\mu_i^* - y_i \log(\mu_i^*))}_{=:\xi_i^*}\right] \qquad (13)$$

$$=: -\frac{1}{k}\sum_{i=1}^{k}u_i \qquad (14)$$

with $u_i = \xi_i^* - \xi_i$. The $u_i$ are independent, identically distributed random variables. Furthermore, $$r(\underline{f}, \underline{f}^*) = \frac{1}{k}\sum_{i=1}^{k}\left[\underbrace{\frac{1}{n}\sum_{j=1}^{n}(\overline{\mu}_j - \overline{\mu}_j^*\log(\overline{\mu}_j))}_{=E\xi_i} - \underbrace{(\frac{1}{n}\sum_{j=1}^{n}(\overline{\mu}_j^* - \overline{\mu}_j^*\log(\overline{\mu}_j^*)))}_{=E\xi_i^*}\right] \qquad (15)$$

$$= -\frac{1}{k}\sum_{i=1}^{k}Eu_i, \text{ so } r(\underline{f}, \underline{f}^*) - \hat{r}(\underline{f}, \underline{f}^*) = \frac{1}{k}\sum_{j=1}^{k}(u_j - Eu_j). \qquad (16)$$

Then the Craig-Bernstein inequality can be applied which states that the probability of $$\frac{1}{k}\sum_{j=1}^{k}(u_j - Eu_j) \geq \frac{t}{k\varepsilon} + k\varepsilon\frac{\operatorname{Var}\left(\frac{1}{k}\sum_{j=1}^{k}u_j\right)}{2(1-\zeta)} \qquad (17)$$

is less than or equal to $e^{-t}$ for $0 < \epsilon h \leq \zeta \leq 1$ and $t > 0$, provided the moment condition $$E|u_j - Eu_j|^l \leq \frac{l!\operatorname{Var}(u_j)h^{l-2}}{2} \qquad (18)$$

holds for all $l \geq 2$ and some fixed $h > 0$. It will be shown below that a certain h can be found such that the moment condition holds for $u_j$. It will also be shown that $$\operatorname{Var}\left(\frac{1}{k}\sum_{j=1}^{k}u_j\right) = \frac{1}{k^2}\sum_{j=1}^{k}\operatorname{Var}(u_j) \leq \frac{C}{k}r(\underline{f}, \underline{f}^*)$$

with a constant C. Armed with these two facts, it is concluded that appropriate $\epsilon$ and $\zeta$ can be found such that the probability of $$r(\underline{f}, \underline{f}^*) - \hat{r}(\underline{f}, \underline{f}^*) \geq \frac{t}{k\varepsilon} + \varepsilon\frac{C}{2(1-\zeta)}r(\underline{f}, \underline{f}^*) \qquad (19)$$

is less than $e^{-t}$. Now, a finite candidate set F is introduced from which it is intended to find a good approximation to f*. A penalty c(f) is assigned to each f which obeys $\Sigma_{f \in F} 2^{-c(f)} \leq 1$. At this stage the candidate set and the penalty are completely arbitrary, as long as this inequality holds.

Setting $\delta := e^{-t}$ and inserting $\delta(f) := 2^{-c(f)}\delta$ in place of $e^{-t}$ in Ineq. (19), the probability that at least one $f \in F$ violates Ineq.

(19) is less than $\Sigma_{f\in F}\delta(f)$ (Boole's inequality). With probability $1-\delta$ therefore, the inequality $$r(\underline{f},\underline{f}^*) - \hat{r}(\underline{f},\underline{f}^*) \leq \frac{c(\underline{f})\log 2 - \log\delta}{k\varepsilon} + \varepsilon\frac{C}{2(1-\zeta)}r(\underline{f},\underline{f}^*) \qquad (20)$$

holds for all f∈F.

Let $\zeta = \varepsilon h$ and $$a := \frac{\varepsilon C}{2(1-\zeta)}.$$

Then choosing some $$0 < \varepsilon < \frac{2}{C+2h}$$

guarantees that $0<a<1$ and $\zeta<1$. Therefore $$(1-a)r(\underline{f},\underline{f}^*) \leq \hat{r}(\underline{f},\underline{f}^*) + \frac{c(\underline{f})\log 2 - \log\delta}{k\varepsilon} \qquad (21)$$

with probability at least $1-\delta$ for all f∈F and all $0<\delta\leq 1$.

The bound on the risk is minimal for that f which minimizes the penalized empirical risk:

$$\hat{f}_{min} = \underset{\underline{f}\in F}{\arg\min}\left(\hat{r}(\underline{f},\underline{f}^*) + \frac{c(\underline{f})\log 2}{k\varepsilon}\right) = \underset{\underline{f}\in F}{\arg\min}\left(\hat{R}(\underline{f}) + \frac{c(\underline{f})\log 2}{k\varepsilon}\right). \qquad (22)$$

Let $f_{mm}$ be the element of F which minimizes the penalized (true) risk, i.e.

$$f_{min} = \underset{\underline{f}\in F}{\arg\min}\left(R(\underline{f}) + \frac{c(\underline{f})\log 2}{k\varepsilon}\right), \qquad (23)$$

then $$(1-a)r(\hat{f}_{min},\underline{f}^*) \leq \hat{r}(\underline{f}_{min},\underline{f}^*) + \frac{c(\underline{f}_{min})\log 2 - \log\delta}{k\varepsilon} \qquad (24)$$

(with probability at least $1-\delta$) since $\hat{f}_{min}$ minimizes the penalized empirical risk, and replacing it by $f_{min}$ on the right hand side can only make the bound bigger.

Repeating the application of the Craig-Bernstein inequality for $\hat{r}(f_{min},f^*)-r(f_{min},f^*)$ (note that the sign is reversed as compared to the above discussion, but the Craig-Bernstein inequality can be employed either way) yields $$\hat{r}(\underline{f}_{min},\underline{f}^*) - r(\underline{f}_{min},\underline{f}^*) \leq ar(\underline{f}_{min},\underline{f}^*) - \frac{\log\delta}{k\varepsilon} \qquad (25)$$

with probability at least $1-\delta$. Using Boole's inequality again to estimate the probability that Ineqs. (24) and (25) are simultaneously satisfied yields $$r(\hat{\underline{f}}_{min},\underline{f}^*) \leq \frac{1+a}{1-a}r(\underline{f}_{min},\underline{f}^*) + \frac{c(\underline{f}_{min})\log 2 - 2\log\delta}{k\varepsilon(1-a)} \qquad (26)$$

with probability at least $1-2\delta$.

Since for any random variable X, $EX \leq \int_0^\infty dt\, \text{Prob}(X\geq t)$, $$X = r(\hat{\underline{f}}_{min},\underline{f}^*) - \frac{1+a}{1-a}r(\underline{f}_{min},\underline{f}^*) - \frac{c(\underline{f}_{min})\log 2}{k\varepsilon(1-a)}$$

and $\delta = e^{-k\varepsilon t(1-a)/2}$ is chosen and Ineq. (26) is integrated over t, which finally gives a bound for $Er(\hat{f}_{min},f^*)$:

$$Er(\hat{\underline{f}}_{min},\underline{f}^*) \leq \frac{1+a}{1-a}r(\underline{f}_{min},\underline{f})^* + \frac{c(\underline{f}_{min})\log 2 + 4}{k\varepsilon(1-a)} \qquad (27)$$

$$\leq \frac{1+a}{1-a}\left(r(\underline{f}_{min},\underline{f}^*) + \frac{c(\underline{f}_{min})\log 2 + 4}{k\varepsilon}\right). \qquad (28)$$

This is the inequality announced above with $$C_1 = \frac{1+a}{1-a}.$$

3.2.2. Proof of the Moment Condition

The proof of the moment conditions illustrates the main difference between the present invention and the concept proposed by Jarvis Haupt et al. (cited above). Two difficulties have to be considered: first, the random variables are not simple independent Gaussians but Poissonians dependent on the values $\mu_l$ which are themselves random variables, and second, Rademacher chaos cannot be used. Rademacher chaos, by its randomization of signs, can deal with sparsity in any basis (the measurement basis is with high probability incoherent with any other basis). Here, it will be shown that the sparsity basis T must be incoherent with the system matrix A. This is in line with the results from J. Candès et al. (cited above).

It must be shown that the moment condition (18) holds for some $h>0$ and all $l\geq 2$. According to Jarvis Haupt et al. (cited above) it is sufficient to find a suitable constant h' for all even l as this implies that the moment condition holds for all l with h=2h' (Lemma 1 of Jarvis Haupt et al.). The random variable $u_j-Eu_j$ can be split into two parts, $u_j-Eu_j=X_1+X_2$, with $$X_1 := -(\mu_j - E\mu_j) + \mu_j^* \log(\mu_j) - E\mu_j^* \log(\mu_j) + \mu_j^* - E\mu_j^* - (\mu_j^* \log(\mu_j^*) - E\mu_j^* \log(\mu_j^*)) \qquad (29)$$

$$X_2 := (y_j - \mu_j^*)\log(\mu_j) - (y_j - \mu_j^*)\log(\mu_j^*) \qquad (30)$$

each of which is a random variable with zero mean. Furthermore, $EX_1X_2=0$. Therefore, Lemma 2 of Jarvis Haupt et al. can be applied, and it is concluded that $X_1+X_2$ satisfies the moment condition (18) for all even $l\geq 4$ with constant $h'=\sqrt{2}(h_1+h_2)$ if $X_1$ and $X_2$ satisfy them separately with constants $h_1$ and $h_2$.

A bounded random variable X with zero mean and $|X|\leq B$ satisfies the moment condition trivially with constant $h_x=B$. If it is observed that $$\bar{\mu}_i^* = \sum_j A_{ij} f_j + r_i = \sum_{jk} A_{ij} T_{jk} \theta_k^* + r_i \leq \quad (31)$$

$$\sum_k \left| \sum_j A_{ij} T_{jk} \right| |\theta_k^*| + r_i \leq \max_{ik}(|(AT)_{ik}|) \sum_{k=1}^v |\theta_k^*| + r_i$$

$$\leq const. \times \sqrt{v} \max_{ik}(|(AT)_{ik}|) \sum_{k=1}^v k^{-1/q} + \max_{i'}(r_{i'}) =: A_{max}, \quad (32)$$

then $\bar{\mu}_i$ is upper bounded by a constant $A_{max}$. If the object $f^*$ is strongly compressible with $0 < q < 1$, then the sum over k can be estimated by a constant, and depending on the value of $\max_{ik}(|(AT)_{ik}|)$, the bound $A_{max}$ may depend on v, or not. If, for instance, $A_{ij} = \delta_{ij}$ and $T_{ij}$ is the Fourier basis, it is known that $$\max_{ik}(|(AT)_{ik}|) = \frac{1}{\sqrt{v}}$$

(the measurement basis and the sparsity basis are maximally incoherent), so $A_{max}$ does not depend on v. This is the optimal situation. In general, however, it is expected that $A_{max} = O(v^\eta)$ with an exponent $0 \leq \eta \leq \frac{1}{2}$. In any case, it can be assumed without loss of generality that $A_{max} > 1$.

Since $\mu_j^*$ is also bounded from below by $r_j$, it may be written (increasing $A_{max}$ if necessary)

$$\mu_j^* \geq \frac{1}{A_{max}}. \quad (33)$$

It is reasonable to demand the same bounds of the candidate projections $\mu_i$. It then follows that $|X_1| \leq const. \times A_{max} \log(A_{max})$, and thus the moment condition holds.

It remains to show that the moment condition also holds for $X_2$. Consider $$EX_2^{2m} = \frac{1}{n} \sum_{i=1}^n M_{2m}(\bar{\mu}_i^*) \log^{2m}\left(\frac{\bar{\mu}_i}{\bar{\mu}_i^*}\right) \quad (34)$$

$$= \frac{1}{n} \sum_{i=1}^n M_2(\bar{\mu}_i^*) \log^2\left(\frac{\bar{\mu}_i}{\bar{\mu}_i^*}\right) \frac{M_{2m}(\bar{\mu}_i^*)}{M_2(\bar{\mu}_i^*)} \log^{2m-2}\left(\frac{\bar{\mu}_i}{\bar{\mu}_i^*}\right). \quad (35)$$

Here $M_{2m}(\mu)$ is the 2m-th central moment of a Poisson variable with parameter $\mu$. The second logarithm on the right hand side can be estimated by $$\log^{2m-2}\left(\frac{\bar{\mu}_i}{\bar{\mu}_i^*}\right) \leq \log^{2m-2}(A_{max}^2). \quad (36)$$

It can be shown (see 3.5 below) that the central moments obey $M_{2m}(\mu) \leq (2m)!(\max(1,\mu))^m$, such that $$\frac{M_{2m}(\bar{\mu}_i^*)}{M_2(\bar{\mu}_i^*)} \leq (2m)! \frac{(\max(1, \bar{\mu}_i^*))^m}{\bar{\mu}_i^*} \leq (2m)! A_{max}^{\frac{2m-2}{2}} \frac{\max(1, \bar{\mu}_i^*)}{\bar{\mu}_i^*} \quad (37)$$

$$\leq (2m)! A_{max}^m \leq \frac{(2m)!}{2} \left(\sqrt{2} A_{max}\right)^{2m-2}. \quad (38)$$

The last step is valid for all $m \geq 2$. Together the bound is obtained $$EX_2^{2m} \leq \frac{(2m)!}{2} \frac{1}{n} \sum_{i=1}^n M_2(\bar{\mu}_i^*) \log^2\left(\frac{\bar{\mu}_i}{\bar{\mu}_i^*}\right) \left(2\sqrt{2} A_{max} \log(A_{max})\right)^{2m-2} \quad (39)$$

$$= \frac{(2m)!}{2} \text{Var}(X_2) \left(2\sqrt{2} A_{max} \log(A_{max})\right)^{2m-2}, \quad (40)$$

which is the moment condition for $X_2$.

Taken together, it is established that $X_1 + X_2$ obey the moment condition with a parameter h with $$h = const. \times A_{max} \log(A_{max}), \quad (41)$$

i.e. h grows proportionally to $A_{max} \log A_{max}$. This is not a problem if $A_{max}$ is of order 1, but as argued above, this is not always guaranteed. The consequences of this will be shown below.

The last task is to find an upper bound for $\text{Var}(u_j)$ where $u_j = \xi_j^* - \xi_j$ and $\xi_j^* = \mu_j^* - y_j \log(\mu_j^*)$, $\xi_j = \mu_j - y_j \log(\mu_j)$. It is easy to show that the average values $Eu_j$ and $Eu_j^2$ are given by $$Eu_j = -\frac{1}{n} \sum_{l=1}^n (R_l(\underline{f}) - R_l(\underline{f}^*)) \quad (42)$$

$$Eu_j^2 = \frac{1}{n} \sum_{l=1}^n [(R_l(\underline{f}) - R_l(\underline{f}^*))^2 + \bar{\mu}_l^*(\log(\bar{\mu}_l) - \log(\bar{\mu}_l^*))^2]. \quad (43)$$

For the definition of $R_l(f)$ see 3.1 above. The variance is then $$\text{Var}(u_j) = \frac{1}{n^2} \sum_{l,l'=1}^n (R_l(\underline{f}) - R_l(\underline{f}^*))(R_{l'}(\underline{f}) - R_{l'}(\underline{f}^*))(n\delta_{ll'} - 1) + \quad (44)$$

$$\frac{1}{n} \sum_{l=1}^n \bar{\mu}_l^* (\log(\bar{\mu}_l) - \log(\bar{\mu}_l^*))^2$$

$$\leq \frac{n-1}{n^2} \sum_{l=1}^n (R_l(\underline{f}) - R_l(\underline{f}^*))^2 + \frac{1}{n} \sum_{l=1}^n \bar{\mu}_l^* (\log(\bar{\mu}_l) - \log(\bar{\mu}_l^*))^2. \quad (45)$$

The inequality follows because each term $R_l(f) - R_l(f)$ is nonnegative and one may thus omit some of the terms with a negative sign in the first sum by replacing $n\delta_{ll'} - 1$ by $n\delta_{ll'} - \delta_{ll'}$.

Since $$\frac{1}{A_{max}} \leq \bar{\mu}_l, \bar{\mu}_l^* \leq A_{max},$$

it follows that $$R_l(\underline{f}) - R_l(\underline{f}^*) \leq A_{max} - \frac{1}{A_{max}} + 2A_{max} \log(A_{max}), \quad (46)$$

such that $$\frac{n-1}{n^2} \sum_{l=1}^{n} (R_l(\underline{f}) - R_l(\underline{f}^*))^2 \le \qquad (47)$$

$$\left(A_{max} - \frac{1}{A_{max}} + 2A_{max}\log(A_{max})\right) \frac{1}{n} \sum_{l=1}^{n} (R_l(\underline{f}) - R_l(\underline{f}^*))$$

$$= \left(A_{max} - \frac{1}{A_{max}} + 2A_{max}\log(A_{max})\right) r(\underline{f}, \underline{f}^*). \qquad (48)$$

It remains to bound the term $$\frac{1}{n} \sum_{l=1}^{n} \overline{\mu}_l^* (\log(\overline{\mu}_l) - \log(\overline{\mu}_l^*))^2.$$

In order to do so, the functions $h_y(x) = y(\log x - \log y)^2$ and $g_y(x) = x - y \log x - (y - y \log y)$ are examined. They both attain their global minimum 0 at $x = y$ and have zero derivative there. Their second derivatives are $$h_y''(x) = \frac{2y}{x^2}(1 + \log y - \log x) \text{ and } g_y''(x) = \frac{y}{x^2},$$

which implies $h''_y(x) \le 2(1 + |\log y - \log x|) g''_y(x) \le 2(1 + 2 \log(A_{max})) g''_y(x)$ for $1/A_{max} \le x, y \le A_{max}$.

Therefore $h_y(x) \le 2(1 + 2 \log(A_{max})) g_y(x)$. Consequently, $$\frac{1}{n} \sum_{l=1}^{n} \overline{\mu}_l^* (\log(\overline{\mu}_l) - \log(\overline{\mu}_l^*))^2 \le 2(1 + 2\log(A_{max})) \frac{1}{n} \sum_{l=1}^{n} (R_l(\underline{f}) - R_l(\underline{f}^*)) \qquad (49)$$

$$= 2(1 + 2\log(A_{max})) r(\underline{f}, \underline{f}^*). \qquad (50)$$

Combined, it is obtained $$\text{Var}(u_j) \le Cr(f, f^*) \qquad (51)$$

with $$C = (A_{max} + 2)(2\log(A_{max}) + 1) - \frac{1}{A_{max}}. \qquad (52)$$

Note that C grows as $A_{max} \log A_{max}$, just as the constant h.

3.3 Application of the Oracle Inequality to Compressible Objects

A compressible object f* is one which can be represented accurately by a small number of coefficients in some basis. To be precise, if $f_j^* = \Sigma_{j'} T_{jj'} \theta_{j'}^*$ where $T_{jj'}$ is an orthogonal matrix and $\theta_j^*$ are the coefficients, and if $f^{(m)}$ is the best m-term approximation to f* in this basis, then the error $$\frac{1}{n}|\underline{f}^{(m)} - \underline{f}^*|^2 \le C_A m^{-2\alpha} \qquad (53)$$

decays at least as fast as $m^{-2\alpha}$ if f* is compressible. As shown above, such compressible objects also lie within a ball of radius $D\sqrt{v}$ with some constant $D > 0$. From the oracle inequality it is known that $$r(\hat{\underline{f}}_{min}, \underline{f}^*) \le C_1 \left( r(\underline{f}_{min}, \underline{f}^*) + \frac{c(\underline{f}_{min})\log(2) + 4}{k\varepsilon} \right),$$

where $f_{min}$ is that vector from the candidate set F which minimizes the risk. This can be reformulated in terms of the coefficient vectors $\underline{\theta}^*$ of f* and $\underline{\theta}$ of f:

$$r(\hat{\underline{f}}_{min}, \underline{f}^*) \le C_1 \left( r(T\underline{\theta}_{min}, T\underline{\theta}^*) + \frac{c(\underline{\theta}_{min})\log(2) + 4}{k\varepsilon} \right). \qquad (54)$$

The candidate set F is chosen to consist of all f which satisfy the bounds $f_j \ge 0$ and $|f| \le \sqrt{v}D$, are compressible and which have a representation $f = T\theta$ where the coefficients $\theta_i$ are uniformly quantized to $v^p$ levels. Let T be the set of coefficient vectors $\theta$ corresponding to the set F. The penalty is chosen to be $c(\underline{\theta}) = (1+p)\log(v)v\|\underline{\theta}\|_0$, i.e. equal to the 0-norm (the number of non-zero elements) of $\theta$, up to a factor. This penalty satisfies $\Sigma_{\theta \in T} 2^{-c(\underline{\theta})} \le 1$, which is called Kraft inequality in this context.

Let $\underline{\theta}^{(m)}$ be the coefficient vector corresponding to the best m-term approximation to f*, i.e. $f^{(m)} = T\theta^{(m)}$, and let $\underline{\theta}_q^{(m)} \in T$ be the closest element to $\underline{\theta}^{(m)}$ in T. $\theta_{min}$ can now be replaced in the oracle inequality by $\overline{\theta}_q^{(m)}$ since $$r(T\underline{\theta}_{min}, T\underline{\theta}^*) + \frac{c(\underline{\theta}_{min})\log(2) + 4}{k\varepsilon} \le r(T\underline{\theta}_q^{(m)}, T\underline{\theta}^*) + \frac{c(\underline{\theta}_q^{(m)})\log(2) + 4}{k\varepsilon}$$

by definition of $\theta_{min}$.

Next Taylor's theorem is applied to the term $r(T\theta_q^{(m)}, T\theta^*)$ and one obtains $$r(T\underline{\theta}_q^{(m)}, T\underline{\theta}^*) = r(T\underline{\theta}^* T\underline{\theta}^*) + \sum_i \left(T(\underline{\theta}_q^{(m)} - \underline{\theta}^*)\right)_i \frac{\partial r}{\partial \theta_i}(T\underline{\theta}^*, T\underline{\theta}^*) + \qquad (55)$$

$$\frac{1}{2} \sum_{ij} \left(T(\underline{\theta}_q^{(m)} - \underline{\theta}^*)\right)_i \frac{\partial^2 r}{\partial \theta_i \partial \theta_j}(T\eta_{ij}, T\underline{\theta}^*) \left(T(\underline{\theta}_q^{(m)} - \underline{\theta}^*)\right)_j.$$

The derivatives here act on the first argument of r. The first and second terms are 0 since the risk r assumes its minimum of 0 when the two arguments coincide. The last term is the remainder term and the $\eta_{ij}$ suitable constants which lie on the straight line between $\overline{\theta}^*$ and $\overline{\theta}_q^{(m)}$. The second derivative which appears in the remainder is $$\frac{\partial^2 r}{\partial \theta_i \partial \theta_j}(T\eta_{ij}, T\underline{\theta}^*) = \frac{1}{n} \sum_{k=1}^{n} R_k''\left(\overline{u}_k(T\underline{\eta}_{ij})\right)(AT)_{ki}(AT)_{kj}. \qquad (56)$$

The remainder term can be estimated by bounding $$R_k''(\overline{u}_k) = \frac{\overline{\mu}_k^*}{\overline{\mu}_k^2} \le A_{max}^3,$$

which is valid for all allowed $\overline{\mu}_k$. This bound may be too conservative: if it is assumed that $f^{(m)}$, as the best m-term approximation, is close to f*, then it may be more appropriate to assume that $\overline{\mu}_k$ is within a factor of, say, 2 of $\overline{\mu}_k^*$. In that case the bound is const.×$A_{max}$. It will be therefore written $R''_k(\overline{\mu}_k) \leq cA_{max}^\beta$ with a constant c>0 and an exponent $1 \leq \beta \leq 3$.

Then for a vector $\underline{x}$ one obtains:

$$\frac{1}{2}\sum_{ij} x_i \frac{\partial^2 r}{\partial \theta_i \partial \theta_j}(T\underline{\eta}_{ij}, T\underline{\theta}^*)x_j \leq \frac{cA_{max}^\beta}{2n}|ATx|^2 \leq \frac{cA_{max}^\beta}{2n}\|AT\|^2 |\underline{x}|^2, \quad (57)$$

where $\|\cdot\|$ is the standard $l_2$ matrix norm. $\|AT\|=\|A\|$ since T is merely a change of basis. The matrix A is a n×v matrix. From matrix algebra it is known that $\|AT\| \leq \sqrt{nv}\|A\|_{max}$, where the maximum norm $\|\cdot\|_{max}$ denotes the maximum absolute value of the entries. It is denoted $$\Lambda := \begin{cases} \|A\| \\ \sqrt{nv}\|A\|_{max}, \end{cases} \quad (58)$$

depending on whether A is such that a statement can be made about $\|A\|$, which might be difficult in general, or not, in which case $\|A\|_{max}$ is much easier to handle but could give a worse error bound in the end. Therefore $$r(T\underline{\theta}_q^{(m)}, T\underline{\theta}^*) \leq \frac{c}{2n}A_{max}^\beta \Lambda^2 |T(\underline{\theta}_q^{(m)} - \underline{\theta}^*)|^2. \quad (59)$$

In order to estimate the risk $r(T\theta_q^{(m)}, T\theta^*)$ it remains to bound $|T(\underline{\theta}_q^{(m)} - \underline{\theta}^*)|^2$ which can be done in the following way:

$$|T(\underline{\theta}_q^{(m)} - \underline{\theta}^*)|^2 = |(\underline{\theta}_q^{(m)} - \underline{\theta}^*)|^2 \leq \quad (60)$$
$$|\underline{\theta}_q^{(m)} - \underline{\theta}^{(m)}|^2 + 2|\underline{\theta}_q^{(m)} - \underline{\theta}^{(m)}| \cdot |\underline{\theta}^{(m)} - \underline{\theta}^*| + |\underline{\theta}^{(m)} - \underline{\theta}^*|^2$$

$$\leq \frac{v^2 D^2}{v^{2p}} + 2\sqrt{\frac{v^3 D^2 C_A}{v^{2p}}} m^{-\alpha} + C_A v m^{-2\alpha}. \quad (61)$$

Combined, it is obtained $$r(\hat{\underline{f}}_{min}, \underline{f}^*) \leq \quad (62)$$
$$C_1\left(\frac{c}{2n}A_{max}^\beta \Lambda^2 \left(\frac{v^2 D^2}{v^{2p}} + 2\sqrt{\frac{v^3 D^2 C_A}{v^{2p}}} m^{-\alpha} + C_A v m^{-2\alpha}\right) + \frac{c(\theta_{min})\log 2 + 4}{k\varepsilon}\right).$$

The two terms involving $v^{-p}$ are exponentially small in p and may be ignored. The remaining terms are minimal when $$m = \left(\frac{(1+p)\log v \log 2}{\alpha k \varepsilon c A_{max}^\beta \Lambda^2 C_A \frac{v}{n}}\right)^{\frac{1}{2\alpha+1}}. \quad (63)$$

Inserting this in Eq. (62) it is obtained $$r(\hat{\underline{f}}_{min}, \underline{f}^*) \leq \quad (64)$$
$$C_1\left[\left(\frac{1}{2\alpha}+1\right)\left(\alpha c A_{max}^\beta \Lambda^2 C_A \frac{v}{n}\right)^{\frac{1}{2\alpha+1}}((1+p)\log 2)^{\frac{2\alpha}{2\alpha+1}}\left(\frac{\log v}{k\varepsilon}\right)^{\frac{2\alpha}{2\alpha+1}} + \frac{4}{k\varepsilon}\right]$$

$$\leq C_1\left[\left(\frac{1}{2\alpha}+1\right)\left(\alpha c C_A \frac{v}{n}\right)^{\frac{1}{2\alpha+1}}((1+p)\log 2)^{\frac{2\alpha}{2\alpha+1}}+4\right] \quad (65)$$
$$\left(\frac{(A_{max}^\beta \Lambda^2)^{\frac{1}{2\alpha}}\varepsilon^{-\frac{2\alpha+1}{2\alpha}}\log v}{k}\right)^{\frac{2\alpha}{2\alpha+1}}$$

The last inequality follows if it is assumed that $A_{max}^\beta \Lambda^2 \geq 1$ and $\varepsilon \leq 1$, both of which is possible without loss of generality since $A_{max}$ may be increased until they are both satisfied. Recall that one may choose any $$0 < \varepsilon < \frac{2}{C+2h} = O\left(\frac{1}{A_{max}\log A_{max}}\right).$$

In order to keep the constant $C_1$ close to 1, $\varepsilon$ should be chosen not too close to the upper bound. For instance, the choice $$\varepsilon = \frac{1}{4}\frac{2}{C+2h} \quad (66)$$

is sensible since it implies $1 < C_1 < 5/3$. Since both C and h increase with $A_{max}$, $\varepsilon < 1$ can be achieved by increasing $A_{max}$ if necessary.

Eq. (65) is the final error bound. Unlike similar bounds as, e.g. in Jarvis Haupt et al. (cited above), the important last term here contains the additional factor $$A_{max}^{\frac{\beta}{2\alpha}}\Lambda^{\frac{1}{\alpha}}\varepsilon^{-\frac{2\alpha+1}{2\alpha}}$$

which depends on v if $A_{max}$ or $\Lambda$ do.

When the object f* is truly sparse, i.e. only m coefficients $\theta_i^*$ are nonzero, the term $|\theta^{(m)} - \theta^*|=0$, so the only relevant term is the penalty term. Then the result is obtained $$r(\hat{\underline{f}}_{min}, \underline{f}^*) \leq C_1((1+p)\log(2)+4)\frac{m\log v}{\varepsilon k}. \quad (67)$$

3.4. Applicability of the Compressed Sensing Strategy

Whether the error bound derived above is useful or not depends on the constants $A_{max}$ and $\Lambda$. If $A_{max}$ and $\Lambda$ do not depend on v, the same type of error bound as in Jarvis Haupt et al. (cited above) is obtained. A situation where this happens is for instance the case $A_{ij}=\delta_{ij}$ and T the Fourier basis.

But even if they do depend on v, the compressive sensing strategy may still be useful if the additional factor $$A_{max}^{\frac{\beta}{2\alpha}}\Lambda^{\frac{1}{\alpha}}\varepsilon^{-\frac{2\alpha+1}{2\alpha}}$$

grows with a power of v less than 1. Imagine, for example, that $A_{max} = O(v^{1/6})$. This would be the case when A is a typical system matrix of a tomographic setup, which has of order $v^{1/3}$ nonzero entries in each row, and T is a random orthogonal matrix, such that $\Sigma_j A_{ij} T_{jk}$ is a sum of $O(v^{1/3})$ terms, each of order $O(v^{-1/2})$ and with random sign, resulting in a number $O(v^{-1/3})$. Hence $A_{max} = O(v^{1/6})$. For such a system matrix, $\|A\| = \Lambda = O(v^{1/3})$ is expected. The important term becomes $$\frac{v^{\frac{2\alpha+\beta+5}{12\alpha}} \log^{\frac{2\alpha+1}{2\alpha}+1} v}{k}. \tag{68}$$

The exponent $$\frac{2\alpha+\beta+5}{12\alpha}$$

is less than 1 for all $$\alpha > \frac{\beta+5}{10} = \frac{3}{5} \tag{67}$$

(if $\beta=1$ is taken). Thus if the object is reasonably compressible, compressive sensing works because this quotient may be small even if $k \ll v$.

For truly sparse objects, a similar discussion as above applies to the v-dependence of $\epsilon^{-1}$. But since it has been argued that $A_{max}$ can be at most of order $O(v^{1/2})$, compressive sensing works in any case if $mv^{1/2} = o(v)$. Note that m may depend on v, so this is not always true.

3.5. Central Moments of the Poisson Distribution

According to J. M. Noras ("Some formulas for moments of the Poisson distribution" in "Phys. Rev. B" vol. 22 (12), 1980, p. 6474-6475) and references therein, the central moments of the Poisson distribution $M_n(\mu)$ obey the following recursion relation:

$$M_n(\mu) = \mu(n-1)! \sum_{i=0}^{n-2} \frac{M_i(\mu)}{i!(n-1-i)!}. \tag{69}$$

It is shown that for all n and $\mu \geq 0$, $M_n(\mu) \leq n!(\max(1,\mu))^{n/2}$. First, it is shown that this is the case for n=0, 1, 2:

$$M_0(\mu) = 1 \leq (\max(1,\mu))^0 = 1 \tag{70}$$

$$M_1(\mu) = 0 \leq (\max(1,\mu))^{1/2} \tag{71}$$

$$M_2(\mu) = \mu \leq 2(\max(1,\mu))^1. \tag{72}$$

It is now proceed by induction and assumed that $M_i(\mu) \leq i! (\max(1,\mu))^{i/2}$ holds for all $0 \leq i < n$. Then $$M_n(\mu) = \mu(n-1)! \sum_{i=0}^{n-2} \frac{M_i(\mu)}{i!(n-1-i)!} \tag{73}$$

$$\leq \mu(n-1) \sum_{i=0}^{n-2} \frac{(n-2)!}{i!(n-1-i)!} i! (\max(1,\mu))^{i/2} \tag{74}$$

$$\leq \mu(n-1) \sum_{i=0}^{n-2} \frac{(n-2)!}{i!(n-2-i)!} (n-2)! (\max(1,\mu))^{(n-2)/2} \tag{75}$$

$$= 2\mu(n-1)!(\max(1,\mu))^{(n-2)/2} \tag{76}$$

$$\leq n!(\max(1,\mu))^{n/2}, \tag{77}$$

which concludes the proof.

3.6. The Calibration Factor a

The minimizer of $$F(\underline{f}) = \hat{R}(\underline{f}) + \frac{C(\underline{f}) \log 2}{k\varepsilon} \tag{78}$$

is the sought-for reconstruction. The following table summarizes the results of the above description of the mathematical background:

$$\underline{f} = T\underline{\theta} \tag{79}$$

$T$: sparsity basis $\tag{80}$ $c(\underline{f}) = (1+p) \log(v) \|\theta\|_0 \tag{81}$ $v$ = number of voxels $\tag{82}$ $p$: coefficients $\theta_i$ are quantized to $v^p$ levels $\tag{83}$ $k$ = number of projections measured $\tag{84}$ $$\varepsilon = \frac{1}{2} \frac{1}{C+2h} \tag{85}$$

$$C = (A_{max}+2)(2\log(A_{max})+1) - \frac{1}{A_{max}} \leq 8 A_{max} \log A_{max} \text{ for } A_{max} \geq e \tag{86}$$

$$h = (10\sqrt{2}+8) A_{max} \log A_{max} \tag{87}$$

$$A_{max} = \max\left(e, \frac{C'}{1-q} I\right) \tag{88}$$

$I = \sqrt{v} \max_{ik} |(AT)_{ik}|$ (incoherence between $\tag{89}$ measurement matrix $A$ and sparsity basis $T$)

$C'$: prefactor of compressibility condition $|\theta_k| \leq C' \sqrt{v} k^{-1/q} \tag{90}$ $q$: compressibility exponent $\tag{91}$ The calibration factor a, which is implicitly defined by $$F(\underline{f}) = \hat{R}(\underline{f}) + \frac{c(\underline{f})}{k\varepsilon} \log(2) =: \hat{R}(\underline{f}) + a \|T^T \underline{f}\|_0, \tag{92}$$

is thus obtained as $$a = \frac{(1+p)\log(v)\log(2)}{k\varepsilon} = \frac{(1+p)\log(v)\log(2)}{k} 2(C+2h) \tag{93}$$

$$= 2 \frac{\log(v)}{k} (1+p)\log(2)(20\sqrt{2}+24) A_{max} \log A_{max} \tag{94}$$

-continued $$= 2\frac{\log(v)}{k}(1+p)\log(2)\left(20\sqrt{2}+24\right)\frac{C'}{1-q}I\log\left(\frac{C'}{1-q}I\right). \quad (95)$$

The parameters appearing in this expression are all known or can be estimated.

The constant C' can be estimated by observing that $$|f| \le \sqrt{v}\, D \Rightarrow C' = \sqrt{\frac{2-q}{2}}\, D.$$

The maximum length $\sqrt{v}D$ of the vector f should be a relatively accessible number.

There must be some prior knowledge as to the compressibility of the objects measured, i.e. the exponent q must be known. This is necessary anyway since the method works best if q>1.

p is the quantization level of the trial vectors θ, i.e. the values $\theta_i$, which necessarily lie between $-\sqrt{v}D$ and $\sqrt{v}D$, are quantized to $v^p$ levels, i.e. the stepsize is of order $v^{1/2-p}$. When v is reasonably large (>100, say), a value of p≈10 will be more than adequate. For larger v, even a smaller p will suffice.

It is requested that the sparsity orthobasis T be known.

The incoherence I can be obtained from the geometry of the setup (i.e. the system matrix A) and the sparsity basis T.

3.7. The Risk Bound

The risk of the reconstruction is bounded by $$r(\hat{f}_{min}, f^*) \le C_1\left[\left(\frac{1}{2\alpha}+1\right)\left(\alpha c C_A \frac{v}{n}\right)^{\frac{1}{2\alpha+1}}((1+p)\log 2)^{\frac{2\alpha}{2\alpha+1}}+4\right] \quad (96)$$

$$\left(\frac{(A_{max}^\beta \Lambda^2)^{\frac{1}{2\alpha}}\log v}{k\varepsilon^{\frac{2\alpha+1}{2\alpha}}}\right)^{\frac{2\alpha}{2\alpha+1}}.$$

The constants appearing here are given by $$C_1 = \frac{5}{3} \quad (97)$$

$$\alpha = \frac{1}{q} - \frac{1}{2} \quad (98)$$

$c = 4$ (more or less arbitrary number of order 1) (99)

$$\beta = 1 \quad (100)$$

$$C_A = \frac{qC'}{2-q} \quad (101)$$

$\Lambda = \|A\|$ matrix norm of the measurement matrix (102)

Then a setup is imagined where n pixels (the potential measurements) could have been measured, but actually only k of them were measured. The risk is a measure of the absolute error between the ideal (i.e. noise free) projections of f* and $\hat{f}_{min}$ for all of the potential measurements (not just the measured ones), normalized by n. That means it is the absolute error per potential measurement pixel.

More important than the absolute error, however, is the relative error, which can be defined as $$\rho(\hat{f}_{min}, f^*) = \frac{r(\hat{f}_{min}, f^*)}{\frac{1}{n}\sum_i \bar{\mu}_i^*} \approx \frac{r(\hat{f}_{min}, f^*)}{\frac{1}{n}\sum_i \bar{\mu}_{min,i}}. \quad (103)$$

Here $\bar{\mu}_i^*$ and $\bar{\mu}_{min,i}$ are the ideal noise free projections of f* and $\hat{f}_{min}$. The error ρ now means a relative error per pixel. This makes the interpretation of ρ very clear: a statement like "the error ρ is smaller than 10%" is perfectly sensible and understandable.

With the error bound as given above (where all constants are known or can be estimated), a bound can thus be obtained retrospectively (i.e., after the reconstruction) for the relative error per pixel and thus gauged whether the reconstruction is good enough for the purpose at hand.

On the other hand, one can estimate i) dose, ii) measurement time, and iii) number of measurements k necessary to obtain a predetermined relative error, e.g. it could be requested ρ≤10%. It is easy to estimate the average value of $\bar{\mu}_i^*$ from the dose and the measurement time, and increasing the dose by a factor of λ>1 increases the ideal projections $\bar{\mu}_i^*$ by λ. Increasing the dose has no effect on the error bound (the right hand side of Eq. (96)) such that the maximum relative error of the new minimizer $\hat{f}_{min}$ is decreased by a factor of 1/λ according to Eq. (103). The same holds for changing the measurement time by λ. In addition, k can be adjusted in order to bring the error bound down.

4. Experimental Results

Figure 3:
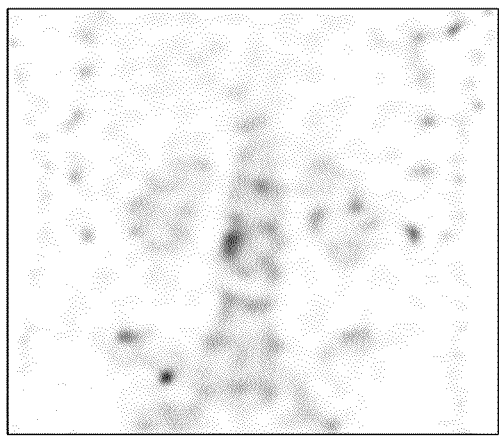
FIG. 3: experimental results illustrating the improved image quality obtained with the present invention.
Figure 3:
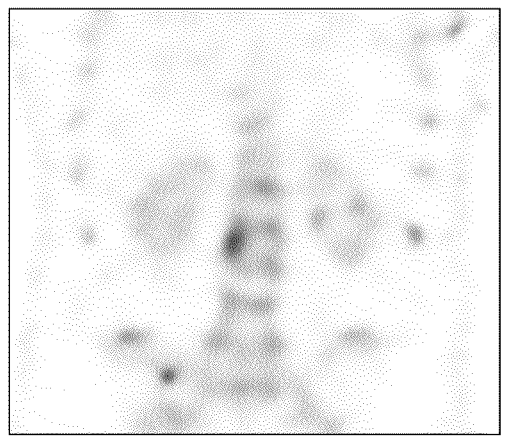
Figure 3:
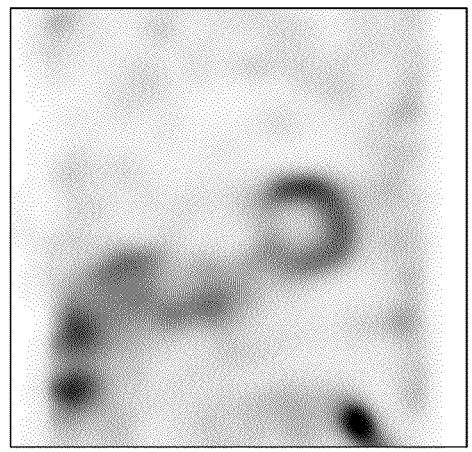
Figure 3:
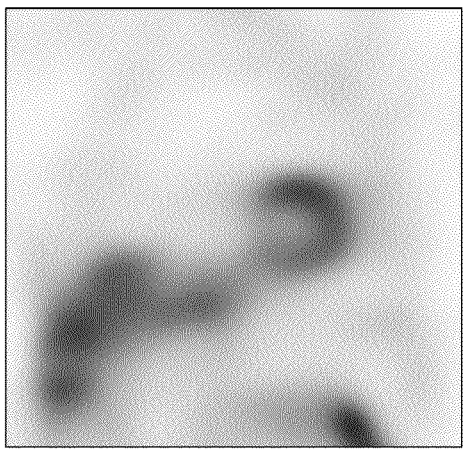

FIG. 3 shows sectional images of an inventive SPECT reconstruction with image data of a heart (FIG. 3A) and a bone (FIG. 3C) in comparison with conventional penalized likelihood reconstructions (FIGS. 3B, 3D). The comparison shows a greatly enhanced resolution obtained with the inventive technique in both cases. It is emphasized that the quality of the illustrated images is restricted due to the printing technique and as a result of a restricted number of angular positions. In both cases, image data are collected at a relatively small number of angular positions (heart: 10 angles, bone: 32 angles). In conventional reconstruction, the number of angular positions must be larger (e.g. around 100 or more) in order to achieve a resolution similar to FIGS. 3A and 3C.

The features of the invention disclosed in the above description, the drawings and the claims can be of significance both individually as well as in combination for the realization of the invention it its various embodiments.

What is claimed is:

1. Image reconstruction method for reconstructing a tomographic image ($f_j$) of a region of investigation within an object, comprising the steps of:
providing detector data ($y_i$) comprising Poisson random values measured at an i-th of a plurality of different positions relative to the object,
providing a predetermined system matrix $A_{ij}$ assigning a j-th voxel of the object to the i-th detector data ($y_i$), wherein the system matrix $A_{ij}$ defines the detector data ($v_i$) as linear combinations of the original object data and is determined by geometric or physical features of an imaging device used for collecting said detector data ($y_i$) and
reconstructing the tomographic image ($f_j$) based on the detector data ($y_i$), said reconstructing step including a procedure of minimizing a functional F(f) depending on the detector data ($y_i$) and the system matrix $A_{ij}$ and additionally including a sparse or compressive representation of the object in an orthobasis T, wherein the tomographic image ($f_j$) represents a global minimum of the functional F(f).

2. Image reconstruction method according to claim 1, wherein the reconstructing step includes a procedure of minimizing the functional $$F(f)=L(\{y_i\},A f)+a\|T^T f\|$$

wherein

L($\{y_i\}$, A f) is a maximum-likelihood risk functional for Poisson statistics, $\|T^T f\|$ is a sparsity enforcing functional including the $l_p$ norm of vector $T^T$ f with 0≤p<2, and a is a calibration factor.

3. Image reconstruction method according to claim 1, wherein the functional F(f)additionally includes an additive regularization function R(f)suppressing artifacts:

$$F(f)=L(\{y_i\},A f)+a\|T^T f\|+R(f).$$

4. Image reconstruction method according to claim 1, wherein the system matrix $A_{ij}$ is adjusted depending on measuring system reference data or acquired using a calibration measurement.

5. Image reconstruction method according to claim 1, wherein the orthobasis T is a basis of three-dimensional wavelets with compact carrier, or an adapted basis depending on properties of the object to be imaged.

6. Image reconstruction method according to claim 1, wherein the tomographic image ($f_j$) is a SPECT image, a PET image, CT image or a confocal microscopy image, and/or the detector data ($y_i$) are provided via a data communication channel, from a data storage or directly by the detector device.

7. Image reconstruction method according to claim 1, comprising at least one of the further steps of storing, recording, displaying and further processing the tomographic image ($f_j$).

8. Imaging method for creating an image ($f_j$) of a region of investigation within an object, comprising the steps of:

collecting detector data ($y_i$) with a detector device of an imaging device, and subjecting the detector data ($y_i$) to the image reconstruction method according to claim 1.

9. Imaging method according to claim 8, comprising the step of randomized setting of angular positions ($\alpha_l$).

10. Imaging method according to claim 8, wherein the detector data ($y_i$) are collected while angular positions ($\alpha_l$) are continuously changed.

11. Imaging method according to claim 8, wherein a number of angular positions ($\alpha_l$) is selected in dependency on a predetermined image quality measure r.

12. Imaging device for imaging a region of investigation in an object, the imaging device comprising:

a detector device for measuring detector data ($y_i$) comprising Poisson random values measured at an l-th angular position ($\alpha_l$) and an l-th radius of rotation ($r_l$) of the detector device relative to the object, and a reconstruction device for reconstructing an image ($f_j$) the object, said reconstruction device being adapted for subjecting the detector data ($y_i$) to an image reconstruction method according to claim 1.

13. Computer program residing on a non-transitory computer-readable medium, with a program code being executable by a machine to perform an image reconstruction method for reconstructing a tomographic image ($f_j$)of a region of investigation within an object, the method comprising:

providing detector data ($y_i$) comprising Poisson random values measured at an i-th of a plurality of different positions relative to the object, providing a predetermined system matrix $A_{ij}$ assigning a j-th voxel of the object to the i-th detector data ($y_i$), wherein the system matrix $A_{ij}$ defines the detector data ($y_i$) as linear combinations of the original object data and is determined by geometric or physical features of an imaging device used for collecting said detector data ($y_i$), and reconstructing the tomographic image ($f_j$) based on the detector data ($y_i$), said reconstructing step including a procedure of minimizing a functional F(f) depending on the detector data ($y_i$) and the system matrix $A_{ij}$ and additionally including a sparse or compressive representation of the object in an orthobasis T, wherein the tomographic image ($f_j$) represents a global minimum of the functional F(f).

14. Apparatus comprising a non-transitory computer-readable storage medium containing program instructions being executable by a machine to perform an image reconstruction method for reconstructing a tomographic image ($f_j$)of a region of investigation within an object, the method including:

providing detector data ($y_i$) comprising Poisson random values measured at an i-th of a plurality of different positions relative to the object, providing a predetermined system matrix $A_{ij}$ assigning a j-th voxel of the object to the i-th detector data ($y_i$), wherein the system matrix $A_{ij}$ defines the detector data ($y_i$) as linear combinations of the original object data and is determined by geometric or physical features of an imaging device used for collecting said detector data ($y_i$), and reconstructing the tomographic image ($f_j$) based on the detector data ($y_i$), said reconstructing step including a procedure of minimizing a functional F(f) depending on the detector data ($y_i$) and the system matrix $A_{ij}$ and additionally including a sparse or compressive representation of the object in an orthobasis T , wherein the tomographic image ($f_j$)represents a global minimum of the functional F(f).

\* \* \* \* \*